(12) United States Patent
Morgan

(10) Patent No.: US 6,202,528 B1
(45) Date of Patent: Mar. 20, 2001

(54) GUIDE FOR BANDSAW BLADE

(76) Inventor: Gary D. Morgan, P.O. Box 5, Sarepta, LA (US) 71071

( * ) Notice: Subject to any disclaimer, the term of this patent is extended or adjusted under 35 U.S.C. 154(b) by 0 days.

(21) Appl. No.: 09/246,610

(22) Filed: Feb. 8, 1999

(51) Int. Cl.$^7$ ...................................................... B26D 5/00
(52) U.S. Cl. .............................................. 83/824; 83/820
(58) Field of Search ............................ 83/820, 826, 824, 83/440

(56) References Cited

U.S. PATENT DOCUMENTS

| | | | |
|---|---|---|---|
| 2,914,100 | * 11/1959 | Lindholm | 83/820 |
| 2,964,076 | 12/1960 | Debs | 143/158 |
| 3,220,446 | * 11/1965 | Burkey | 83/820 |
| 3,280,862 | 10/1966 | Foley | 143/162 |
| 3,534,647 | 10/1970 | Mills | 83/201.15 |
| 3,643,536 | 2/1972 | Alexander | 83/201.15 |
| 3,817,142 | * 6/1974 | Fingerle et al. | 83/820 |
| 4,189,968 | 2/1980 | Miranti | 83/816 |
| 4,920,846 | * 5/1990 | Duginske et al. | 83/820 |
| 5,067,381 | 11/1991 | Ohnishi | 83/820 |
| 5,408,910 | 4/1995 | Ohnishi | 83/820 |

FOREIGN PATENT DOCUMENTS

| | | | |
|---|---|---|---|
| 1223489 | * 8/1966 | (DE) | 83/820 |
| 004016255 | * 11/1991 | (DE) | |
| 1448982 | * 7/1966 | (FR) | 83/820 |

* cited by examiner

Primary Examiner—Douglas D. Watts
Assistant Examiner—Omar Flores-Sánchez
(74) Attorney, Agent, or Firm—John M. Harrison

(57) ABSTRACT

A guide for a continuous, driven bandsaw blade, which guide is characterized by a pair of blade supports provided in spaced-apart relationship with respect to each other for receiving the bandsaw blade. Each blade support includes a typically vertical support post having a pair of top and bottom guide brackets vertically adjustably mounted on the support post. A pair of carbide blade guide blocks or discs is secured on the top guide bracket and on the bottom guide bracket, respectively, of each blade support. The driven bandsaw blade is continually fed between each top and bottom set of blade guide blocks or discs, which guide the cutting segment of the bandsaw blade in a typically horizontal cutting plane between the blade supports. A typically horizontally adjustable, rotatable blade guide wheel is mounted on the bottom guide bracket of each blade support for engaging and maintaining the bandsaw blade in a typically horizontal configuration between the blade guide blocks as pressure is applied to the cutting edge of the bandsaw blade. The top and bottom guide brackets of each blade support can be adjusted by means of mount bolts on the corresponding slotted support post to accommodate the bandsaw blade at a desired cutting height.

8 Claims, 3 Drawing Sheets

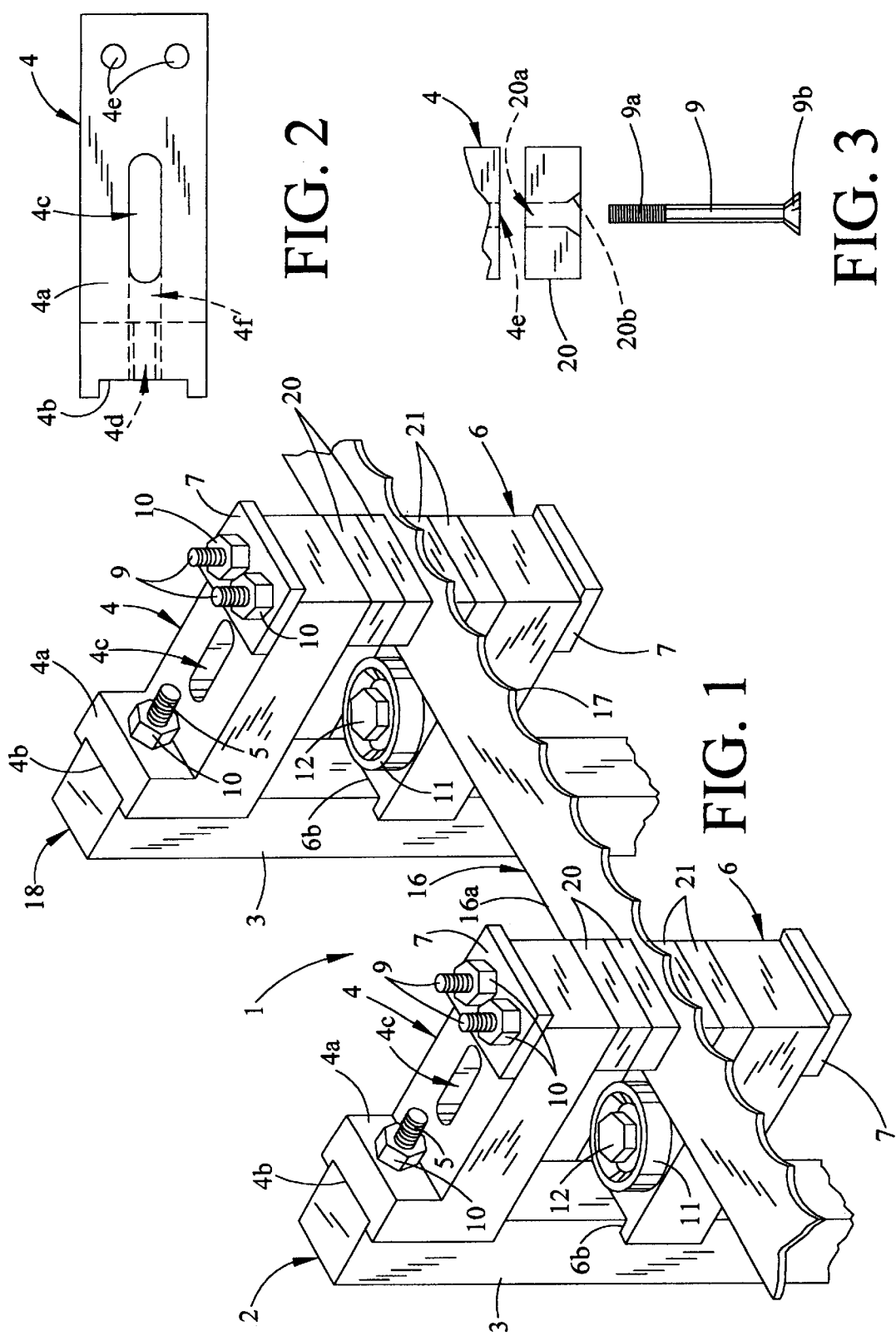

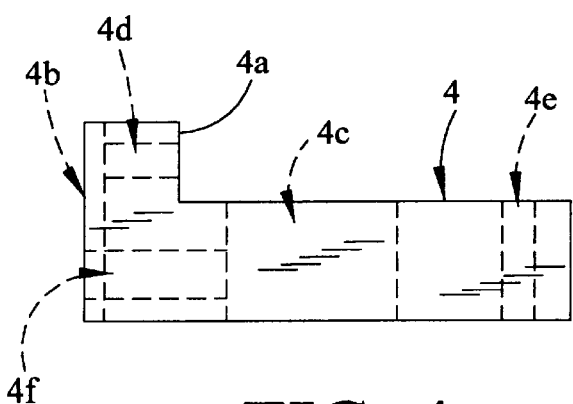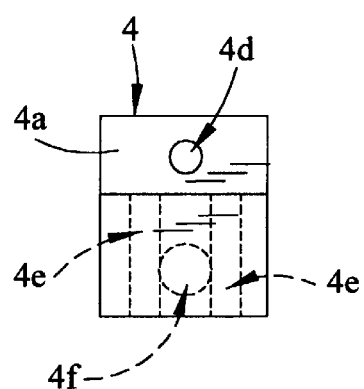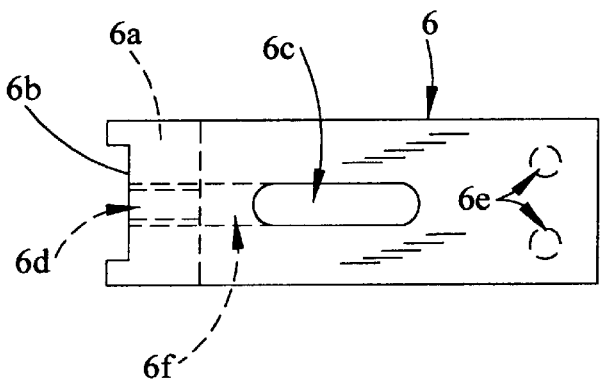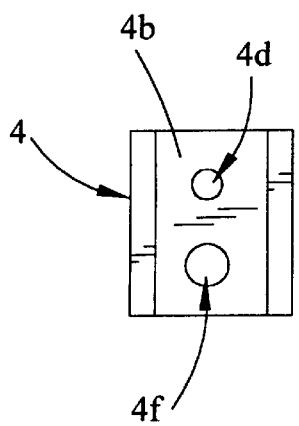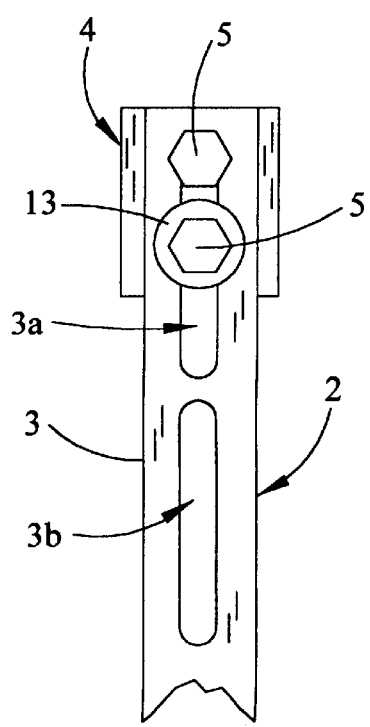
FIG. 4
FIG. 5
FIG. 6
FIG. 8
FIG. 7

GUIDE FOR BANDSAW BLADE

BACKGROUND OF THE INVENTION

1. Field of the Invention

This invention relates to guides for bandsaw blades and more particularly, to a device for precisely guiding and stabilzing the typically horizontal cutting segment of a continuous bandsaw blade in a horizontal cutting plane as the bandsaw blade is driven on the spaced-apart blade drive wheels of a bandsaw. In a preferred embodiment the guide for bandsaw blade of this invention is characterized by a pair of blade supports provided in spaced-apart relationship with respect to each other inside the orbit of the bandsaw blade for receiving the bandsaw blade. Each blade support includes a pair of typically vertically adjustable top and bottom guide brackets mounted on a typically vertical support post and a selected number of carbide blade guide blocks or discs are secured on the top guide bracket and the bottom guide bracket, respectively, of each blade support. As the bandsaw blade is driven in an orbit, the blade is continually fed between each top and bottom set of blade guide blocks or discs, which guide and stabilize the cutting segment of the bandsaw blade in a horizontal cutting plane between the blade supports. A rotatable, typically horizontally-adjustable blade guide wheel is provided on the bottom or top guide bracket of each blade support for engaging and maintang the bandsaw blade in the horizontal configuration between the blade guide blocks as pressure is applied to the cutting edge of the bandsaw blade between the blade guide wheels. The top and bottom guide brackets of each blade support can be typically vertically adjusted on the corresponding slotted support post to accommodate the bandsaw blade at a desired cutting height. While the guide assembly described above is set up for guiding and stabilizing a horizontal cutting blade segment, the assembly can equally well be set up to guide and stabilize a vertical cutting blade segment.

2. Description of the Prior Art

Bandsaws are typically characterized by a bandsaw motor and blade combination which is operated to drive a flexible, continuous, serrated blade in an orbit or path for cutting a variety of materials including lumber, wood stock, metals, ceramics and plastics. Because the bandsaw blade is typically trained around a pair of spaced-apart blade drive wheels, the cutting plane of the orbiting bandsaw blade may be vertical plane or horizontal, and a mechanism must be provided which guides the cutting segment of the vertical blade through the horizontal or vertical path of travel. Moreover, because the blade is thin and flexible it is subject to extensive vibration and distortion during the sawing operation, which could result in an uneven cut in the workstock if the bandsaw blade is not adequately stabilized in the horizontal or vertical cutting plane. Accordingly, blade guiding or stabilizing mechanisms are a well-known expedient in the bandsaw art.

Typical of such bandsaw blade guiding mechanisms is the "Band Saw Guide and Cleaner" described in U.S. Pat. No. 2,964,076, dated Dec. 13, 1960, to Victor Debs. The Debs band saw guide is characterized by a support track having a pair of parallel vertical blade guide arms slidably and adjustably suspended from the support track. A blade guide bracket is provided on the extending bottom end of each blade guide arm and each includes a pair of blade contacting elements between which is inserted the bandsaw blade, the cutting portion of which spans the blade guide brackets in a vertical cutting plane. A lubricating roller provided on each blade guide bracket engages the non-cutting edge of the bandsaw blade and discharges a coolant or lubricant on the driven blade as the blade passes through the blade guide bracket. U.S. Pat. No. 3,280,862, dated Oct. 25, 1966, to Joseph J. Foley, discloses a "Bearing for Power Band Meat Saw" for stabilizing a power meat saw blade which extends for reciprocation through a slot provided in a meat cutting table. Two of the bearings are used to stabilize the blade and include a first bearing housing supported above the table surface and a second bearing housing provided beneath the table. A roller bearing provided in each bearing housing contacts the non-cutting edge of the vertical blade and stabilizs the blade as meat is pressed against the cutting edge of the reciprocating blade. U.S. Pat. No. 3,534,647, dated Oct. 20, 1970, to Albert D. Mills, discloses an "Apparatus for Mining Vibration in Band Sawing Machines" in which a pair of support arms extends between a pair of vertically-spaced drive pulleys, upon which is trained a continuous bandsaw blade. A blade guide assembly provided on the extending end of each support arm receives the blade and carbide inserts are fitted in the blade guide assemblies for contacting the opposite surfaces of the blade and miniizing vibration of the cutting segment of the blade between the blade guide assemblies as the blade is driven on the drive pulleys. A "Self-Adjusting Roller Guide" is detailed in U.S. Pat. No. 3,643,536, dated Feb. 22, 1972, to Carl J. Alexander. The Alexander roller guide includes a yoke having a first leg fitted with first and second guide rollers disposed in perpendicular relationship with respect to each other for contacting a surface and the non-cutting edge, respectively, of a bandsaw blade. A third roller provided on a second leg disposed parallel to the first leg normally engages the first roller but can be moved from engagement therewith to facilitate inserting the bandsaw blade between the opposing first and third rollers. U.S. Pat. No. 4,189,968, dated Feb. 26, 1980, to Joseph P. Miranti Jr., discloses a "Mobius Strip Bandsaw Blade" characterized by a continuous bandsaw blade having a selected length and constructed in the form of a Mobius strip. U.S. Pat. No. 5,067,381, dated Nov. 26, 1991, and U.S. Pat. No. 5,408,910, dated Apr. 25, 1995, both to Kenji Ohnishi, et al., describe a "Vibration Prevention Device for Bandsaw Machines" characterized by a guide arm adapted for guiding a bandsaw blade from a horizontal configuration to a vertical cutting configuration by engaging both surfaces of the bandsaw blade. A roller provided on the guide arm urges the bandsaw blade against the guide arm or against an opposing second roller to prevent vibration of the driven blade.

An object of this invention is to provide an adjustable guide for stabilizing the cutting segment of a continuous bandsaw blade in a selected cutting plane.

Another object of this invention is to provide an adjustable guide having carbide guides and adjustable blade guide rollers for stabilizing the cutting segment of a driven bandsaw blade in a horizontal or vertical cutting plane.

Still another object of this invention is to provide a guide for a bandsaw blade, which guide is characterized by a pair of blade supports provided in spaced-apart relationship with respect to each other inside the orbit or path of a continuous, driven bandsaw blade, adjustable blade guides provided in the blade supports and a pair of adjustable blade guide rollers or wheels contacting the blade, for stabilizing the cutting segment of the bandsaw blade in a horizontal or vertical cutting plane between the blade supports.

Yet another object of this invention is to provide a guide for stabilizing the cutting segment of a bandsaw blade in a horizontal cutting plane, which guide is characterized by a pair of spaced-apart, slotted blade supports and a pair of slotted top and bottom guide brackets provided on each blade support for receiving the bandsaw blade, which guide brackets can be vertically adjusted on the respective blade supports and seat replaceable and adjustable guides and adjustable, rotatable guide wheels, for accommodating the bandsaw blade at a selected cutting height.

A still further object of this invention is to provide a guide for orienting a cutting segment of a continuous driven bandsaw blade in a horizontal cutting plane and stabilizing the cutting segment of the bandsaw blade in the horizontal cutting plane, which bandsaw blade is characterized by a pair of slotted vertical support posts provided in spaced-apart relationship with respect to each other inside the orbit of the driven handsaw blade adjacent to the bandsaw blade; a pair of top and bottom guide brackets provided for vertical adjustment on each support post; a selected number of replaceable carbide blade guide blocks or discs secured on the top guide bracket and on the bottom guide bracket, respectively, of each blade support post, with the driven bandsaw blade fed between each top and bottom set of blade guide blocks, which serve to guide and stabilize the cutting segment of the bandsaw blade in a horizontal cutting plane between the blade support posts; and a horizontally-adjustable, rotatable blade guide wheel provided on the top or bottom guide bracket of each blade support post for engaging and maintaining the driven bandsaw blade in linear alignment between the blade guide blocks or discs as pressure is applied to the cutting edge of the handsaw blade.

SUMMARY OF THE INVENTION

These and other objects of the invention are provided in a guide for stabilizing the cutting segment of a continuous, driven bandsaw blade in a horizontal or vertical cutting plane, which guide in a preferred embodiment is characterized by a pair of blade support posts having linear slots and placed in spaced-apart relationship with respect to each other inside the orbit or path of the bandsaw blade adjacent to the bandsaw blade. Each slotted blade support receives a pair of slotted top and bottom guide brackets adjustably mounted thereon. A selected number of adjustably mounted carbide blade guide blocks or discs are secured by bolts on the bottom guide bracket and on the top guide bracket, respectively, of each blade support. The driven bandsaw blade is continually fed between the top and bottom blade guide blocks or discs of each blade support, which blade guide blocks or discs guide and stabilize the cutting segment of the bandsaw blade in a horizontal or vertical cutting plane between the blade supports. A rotatable, slidably-adjustable blade guide wheel is typically provided on the bottom guide bracket for engaging and maintaining the bandsaw blade in the horizontal or vertical configuration between the blade guide blocks, as pressure is applied to the cutting edge of the bandsaw blade. The top and bottom guide brackets can be slidably adjusted on the support posts of the corresponding blade support by means of mount bolts to accommodate the bandsaw blade in a selected cutting position.

BRIEF DESCRIPTION OF THE DRAWINGS

The invention will be better understood by reference to the accompanying drawings, wherein:

FIG. 1 is a perspective view, partially in section, of a preferred embodiment of the guide for bandsaw blade of this invention, illustrated in functional, blade-guiding and stabilizing configuration;

FIG. 2 is a top view of a slotted top and bottom guide bracket component of the guide for bandsaw blade;

FIG. 3 is an exploded view, partially in section, of a blade guide block component of the guide for bandsaw blade, more particularly detailing a preferred mounting technique for securing the blade guide block and spacer to the top or bottom guide bracket;

FIG. 4 is a side view of the slotted top and bottom guide bracket illustrated in FIG. 2;

FIG. 5 is a front end view of the slotted top and bottom guide bracket illustrated in FIG. 4;

FIG. 6 is a bottom view of the slotted top and bottom guide bracket component of the guide for bandsaw blade;

FIG. 7 is a rear view, partially in section, of a slotted support post component of a blade support of the guide for bandsaw blade, with a slotted top guide bracket mounted on the support post;

FIG. 8 is a flange end view of the slotted top guide bracket illustrated in FIG. 7;

DESCRIPTION OF THE PREFERRED EMBODIMENTS

Figure 9:
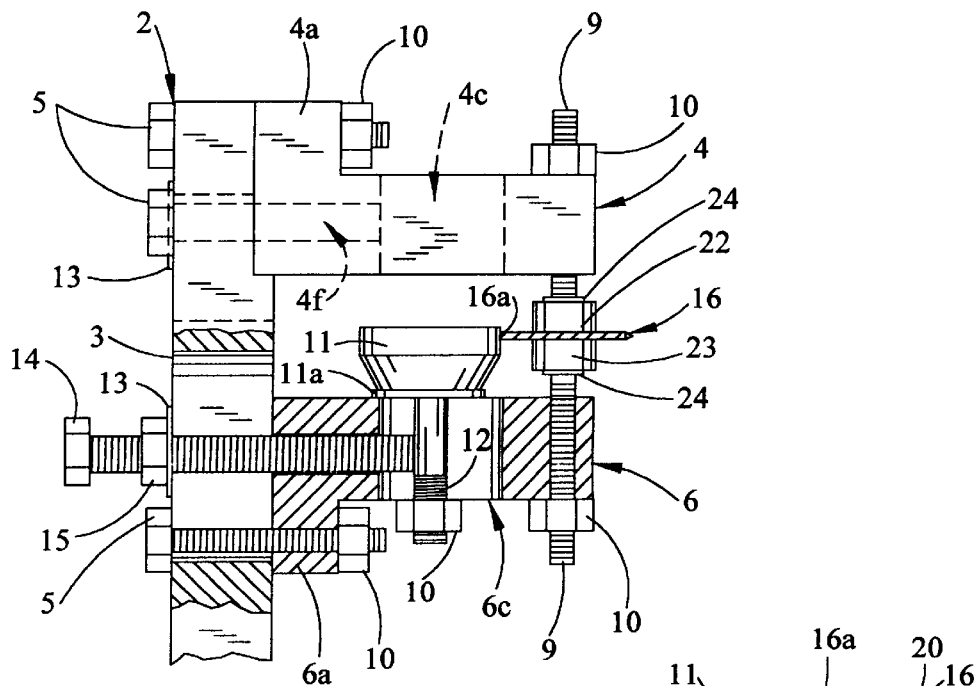
FIG. 9 is a side view, partially in section, of an alternative blade guide disc component of the guide for bandsaw blade, illustrated in functional blade-supporting and guiding configuration.

Referring initially to FIGS. 1–9 of the drawings, in a preferred embodiment the guide for bandsaw blade of this invention is set up for horizontal operation and is generally illustrated by reference numeral 1. As illustrated in FIG. 1, the guide for bandsaw blade 1 includes a first blade support 2 and a similar second blade support 18, positioned in vertically spaced-apart relationship with respect to each other inside the orbit or path of a continuous, motor-driven bandsaw blade 16, for guiding the bandsaw blade 16 in a horizontal cutting plane between the first blade support 2 and second blade support 18. The first blade support 2 and second blade support 18 each includes a vertical support post 3, the bottom end (not illustrated) of which is typically attached to a suitable support or mount (also not illustrated). As illustrated in FIG. 7, an elongated, vertical top bracket adjustment slot 3a is provided in the support post 3 adjacent to the upper end thereof, and a simiar bottom bracket adjustment slot 3b is provided in the support post 3 beneath and in vertical alignment with the top bracket adjustment slot 3a, for purposes which will be hereinafter further described. As further illustrated in FIG. 1, a top guide bracket 4 and a bottom guide bracket 6 are typically identical in design and are each vertically adjustably mounted on the support post 3 of the first blade support 2 and the second blade support 18, respectively. Each top guide bracket 4 includes a top bracket attachment flange 4a provided at one end thereof and as illustrated in FIG. 8, a bracket notch 4b is shaped in the flanged end of the top guide bracket 4 for receiving the support post 3, as further illustrated in FIG. 1. An elongated wheel adjustment slot 4c, the purpose of which will be hereinafter further described, extends through each top guide bracket 4, as illustrated in FIGS. 1 and 4. The bottom guide brackets 6 mirror the top guide brackets 4 when mounted on the respective support posts 3 and each includes a bottom bracket attachment flange 6a (FIG. 9), a bracket notch 6b (FIG. 6) shaped in the flanged end of the bottom guide bracket 6 for receiving a support post 3, as well as an elongated wheel adjustment slot 6c extending through each bottom guide bracket 6, as particularly illustrated in FIGS. 6 and 9.

As further illustrated in FIGS. 1, 7 and 9, each top guide bracket 4 is mounted at a selected height on the corresponding support post 3, with the top bracket attachment flange 4a extending upwardly, by inserting the corresponding support post 3 in the bracket notch 6b, extending a bracket mount bolt 5 through the top bracket adjustment slot 3a provided in the support post 3 and through a horizontal flange bolt opening 4d (illustrated in phantom in FIG. 4) which extends through the top bracket attachment flange 4a, and threading and tightening a nut 10 on the bracket mount bolt 5 against the top bracket attachment flange 4a. A second bracket mount bolt 5 is extended through each support post 3 and is threaded into the top bracket attachment flange 4a of the corresponding top guide bracket 4, as illustrated in FIG. 9. It will be appreciated by those skilled in the art that each top guide bracket 4 can be vertically adjusted on the corresponding support post 3 by loosening the nut 10 on the top bracket mount bolt 5, loosening the bottom bracket bolt 5, raising or lowering the top guide bracket 4 on the support post 3 and the bracket mount bolt 5 in the top bracket adjustment slot 3a and retightening the nut 10 against the top bracket attachment flange 4a and tightening the bottom bracket bolt 5.

As further illustrated in FIG. 1, the bottom guide bracket 6 is mounted on the support post 3 at a selected spacing beneath the top guide bracket 4 with the bottom bracket attachment flange 6a extending downwardly, by inserting the support post 3 in the bracket notch 6b, extending a bracket mount bolt 5 through the bottom bracket adjustment slot 3b provided in the support post 3 and through a flange bolt opening 6d (illustrated in phantom in FIG. 6) extending horizontally through the top bracket attachment flange 6a, and threading and tightening a nut 10 on the bracket mount bolt 5 against the bottom bracket attachment flange 6a. Accordingly, the bottom guide bracket 6 can be also vertically adjusted on the support post 3 by loosening the nut 10 on the bracket mount bolt 5, raising or lowering the bottom guide bracket 6 on the support post 3 and the bracket mount bolt 5 in the bottom bracket adjustment slot 3b, and re-tightening the nut 10 against the bottom bracket attachment flange 6a, in the same manner as described above with respect to the top guide bracket 4.

Figure 10:
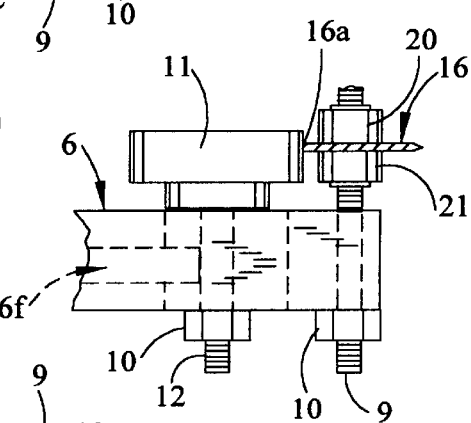
FIG. 10 is a side view, partially in section, of a slotted bottom guide bracket component of the guide for bandsaw blade, more particularly illustrating a blade guide wheel rotatably bolted on the slotted bottom guide bracket for engaging and maintaining the bandsaw blade in position between the blade guide discs.

Referring again to FIGS. 1 and 4–6 and 9 and to FIG. 10 of the drawings, in a first preferred embodiment of the invention a pair of carbide top blade guide blocks 20 is typically bolted on the bottom surface of the top guide bracket 4, and a pair of carbide bottom blade guide blocks 21 is typically bolted on the bottom guide bracket 6 beneath the top blade guide block 20, as illustrated in FIG. 1, which shows one top blade guide block 20 as a spacer and a bottom blade guide block 21 also as a spacer. Each top blade guide block 20 and bottom blade guide block 21 typically has a rectangular configuration and a pair of adjacent guide bolt openings 20a (one of which is shown in phantom in FIG. 3) extends through each top blade guide block 20 and bottom blade guide block 21 for receiving respective guide block mount bolts 9, each having bolt threads 9a. As further illustrated in FIG. 3, each guide block mount bolt 9 is extended upwardly through the corresponding guide bolt opening 20a and through a corresponding, registering vertical bolt opening 4e, a pair of which is provided in adjacent relationship in the top guide bracket 4 as illustrated in FIG. 2 and in phantom in FIGS. 4 and 5. A rectangular bolt plate 7, provided with a pair of adjacent bolt openings (not illustrated) is typically fitted on the threaded upper ends of the guide block mount bolts 9 and a nut 10 is threaded on the bolt threads 9a of each guide block mount bolt 9 and tightened against the bolt plate 7, as illustrated in FIG. 1, to firmly seat the bolt head 9b of each guide block mount bolt 9 in a corresponding bolt seat 20b, countersunk in each top blade guide block 20, as further illustrated in FIG. 3. At least one carbide bottom blade guide block 21 is likewise mounted on the bottom guide bracket 6 beneath the top blade guide block 20, by extending a pair of guide block mount bolts 9 downwardly through respective guide bolt openings 20a and through registering vertical bolt openings 6e (FIG. 6) provided in the bottom guide block 21, inserting a bolt plate 7 on the threaded lower ends of the respective guide block mount bolts 9 as illustrated in FIG. 1 and firmly seating the bolt head 9b of each guide block mount bolt 9 in the corresponding countersink bolt seat 20b, by threading and tightening a nut 10 on each guide block mount bolt 9. It will be appreciated by those skilled in the art that any number of top blade guide blocks 20 and bottom blade guide blocks 21 can be bolted to the top guide bracket 4 and bottom guide bracket 6, respectively, as desired.

Figure 11:
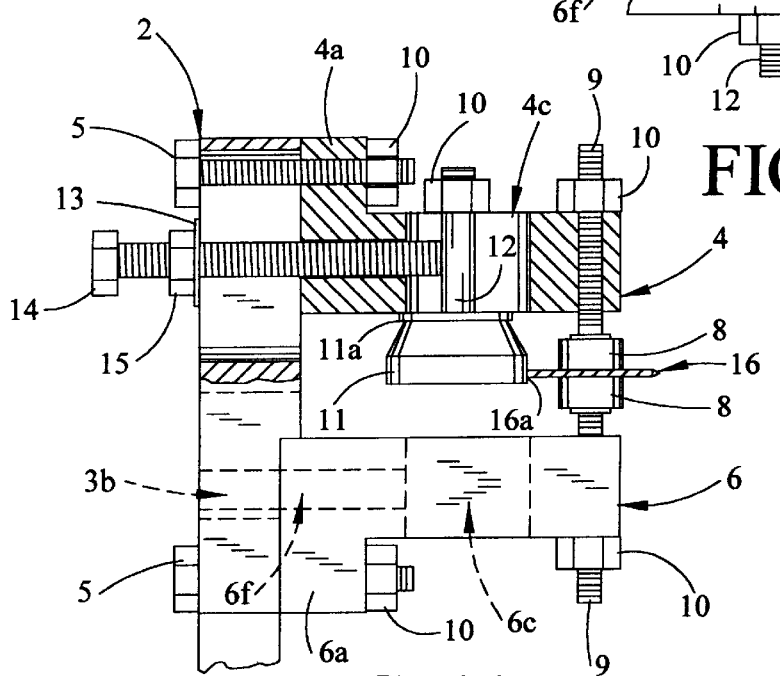
FIG. 11 is a side view, partial in section, of a blade support of the guide for bandsaw blade, more particularly illustrating the rotatable and adjustable blade guide wheel bolted on the top guide bracket for engaging and maintaining the bandsaw blade in position between a pair of blade guide discs.

Referring again to FIGS. 1 and 9 and to FIGS. 10 and 11 of the drawings, a rotatable blade guide wheel 11 is rotatably and horizontally adjustably mounted on the bottom guide bracket 6 of the first blade support 2 and the second blade support 18, respectively, for engaging the non-cutting edge 16a of the bandsaw blade 16 and maintaining the driven bandsaw blade 16 in position between the top guide blocks 20 and bottom guide blocks 21 during cutting operation of the bandsaw blade 16, as illustrated in FIG. 9 and hereinafter further described. Referring to FIG. 9, each blade guide wheel 11 is rotatably mounted on a circular wheel bushing or washer 11a which spans the wheel adjustment slot 6c, and a guide wheel mount bolt 12 extends downwardly through the blade guide wheel 11 and wheel adjustment slot 6c and threadably receives a nut 10 on the bottom end thereof to secure the blade guide wheel 11 against the wheel bushing 11a. A wheel adjustment bolt 14 is extended through the horizontal bottom bracket adjustment slot 3b (provided in each support post 3, FIG. 7) and threaded through a registering wheel adjustment bolt opening 6f (illustrated in phantom in FIG. 6), provided in the bottom guide bracket 6 and which communicates with the wheel adjustment slot 6c. As each wheel adjustment bolt 14 is progressively threaded into the corresponding wheel adjustment bolt opening 6f, the extending end of each wheel adjustment bolt 14 engages the corresponding guide wheel mount bolt 12 in the wheel adjustment slot 6c, as illustrated in FIG. 9 and this action pushes the blade guide wheel 11 against the non-cutting edge 16a of the bandsaw blade 16. A lock nut 15, threaded on the wheel adjustment bolt 14 as further illustrated in FIG. 9, is tightened against a washer 13 which engages the support post 3, to lock the wheel adjustment bolt 14 at a selected position along the wheel adjustment slot 6c and the blade guide wheel 11 in a selected position against the bandsaw blade 16. It will be appreciated by those skilled in the art that the blade guide wheels 11 of the first blade support 2 and second blade support 18, respectively, prevent the driven bandsaw blade 16 from being displaced from between the respective top blade guide blocks 20 and bottom blade guide blocks 21 as pressure is applied against the blade teeth 17 during cutting operation of the bandsaw blade 16.

Referring now to FIG. 11 of the drawings, it will be further appreciated by those skilled in the art that each blade guide wheel 11 can be removed from the corresponding bottom guide bracket 6, inverted and mounted on the top guide bracket 4, as desired, for achieving the same purpose as is achieved when the blade guide wheel 11 is mounted on the bottom guide bracket 6. Accordingly, the blade guide wheel 11 can be removed from the bottom guide bracket 6 by unthreading the nut 10 from the guide wheel mount bolt 12 illustrated in FIG. 9, removing the guide wheel mount bolt 12 and blade guide wheel 11 from the bottom guide bracket 6, extending the guide wheel mount bolt 12 upwardly through the wheel adjustment slot 4c of the top guide bracket 4 with the blade guide wheel 11 in the inverted configuration illustrated in FIG. 11 and again tightening the nut 10 on the threaded upper end of the guide wheel mount bolt 12 to secure the wheel bushing 11a between the blade guide wheel 11 and top guide bracket 4. The wheel adjustment bolt 14 may then be removed from the wheel adjustment bolt opening 6f and bottom bracket adjustment slot 3b, extended through the top bracket adjustment slot 3a, threaded through the wheel adjustment bolt opening 4f (illustrated in phantom in FIG. 9) of the top guide bracket 4, in place of the bracket mount bolt 5, against the guide wheel mount bolt 12 and locked in place using the lock nut 15, to secure the blade guide wheel 11 against the noncutting edge 16b of the bandsaw blade 16, as described above with respect to the blade guide wheel illustrated in FIG. 9.

Referring again to FIGS. 1, 9, 10 and 11 of the drawings, a typical bandsaw (not illustrated) includes a continuous bandsaw blade 16, having blade teeth 17 and trained around a pair of spaced-apart pulleys or blade drive wheels (not illustrated), with the cutting plane of the bandsaw blade 16 typically, but not necessarily, oriented in a horizontal plane. One of the blade drive wheels is typically driven by a conventional drive system (also not illustrated) which imparts travel of the bandsaw blade 16 around an orbit or path defined by the blade drive wheels, in conventional fashion. In typical application of the guide for bandsaw blade 1 of this invention, the first blade support 2 and second blade support 18 of the guide for bandsaw blade 1 are mounted on the frame or other element (not illustrated) of the saw apparatus (also not illustrated), in position inside the orbit or path of the continuous bandsaw blade 16 and between the blade drive wheels (not illustrated) of the drive system. The top guide bracket 4 and bottom guide bracket 6 on both the first blade support 2 and second blade support 18 are each initially adjusted on the corresponding support post 3 according to the selected cutting height or position of the bandsaw blade 16, which cutting height or position is achieved by positioning the blade drive wheels at a selected location. In the horizontal setup illustrated in the drawings, vertical adjustment of the top guide bracket 4 is accomplished by loosening the nut 10 threaded on the bracket mount bolt 5 which extends through the top bracket attachment flange 4a and the bracket mount bolt 5 threaded into the top bracket attachment flange 4a (FIG. 9), as heretofore described, raising or lowering the top guide bracket 4 on the support post 3 and re-tightening the nut 10 against the top bracket attachment flange 4a and securing the bracket mount bolt 5. The bottom guide bracket 6 is next raised or lowered on the support post 3, also by loosening the nut 10 on the bracket mount bolt 5 which extends through the bottom bracket attachment flange 6a (FIG. 9), raising or lowering the bottom guide bracket 6 on the support post 3 and re-tightening the nut 10 against the bottom bracket attachment flange 6a. The cutting stretch or length of the bandsaw blade 16 is thus positioned between the top blade guide blocks 20 and the bottom blade guide blocks 21 (FIG. 1) or the top blade guide discs 22 and the bottom blade guide discs 23 (FIGS. 9–11) of both the first blade support 2 and the second blade support 18. The top guide bracket 4 and bottom guide bracket 6 can be finely adjusted on the corresponding support post 3 in the same manner as described above, such that the bandsaw blade 16 is maintained in a horizontal position and yet remains sidably interposed between the top blade guide blocks 20 and bottom blade guide blocks 21 or the top blade guide discs 22 and bottom blade guide discs 23, respectively. Each blade guide wheel 11 is next horizontally adjusted on the corresponding bottom guide bracket 6 (FIG. 9) or top guide bracket 4 (FIG. 11) to engage each blade guide wheel 11 against the non-cutting edge 16a of the bandsaw blade 16 and maintain the bandsaw blade 16 in the horizontal configuration between the top blade guide blocks 20 and bottom guide blocks 21. This adjustment is effected as heretofore described, by loosening the lock nut 15, threading each horizontal wheel adjustment bolt 14 into the wheel adjustment bolt opening 6f or wheel adjustment bolt opening 4f, respectively, and against the guide wheel mount bolt 12 and re-tightening the lock nut 15 against the washer 13. As the bandsaw blade 16 is driven in an orbit or path on the blade drive wheels in the direction indicated by the arrow in FIG. 1 it is maintained in this horizontal configuration by the top blade guide blocks 20 and bottom blade guide blocks 21 (FIG. 1) or the top blade guide discs 22 and bottom blade guide discs 23 (FIGS. 10 and 11). As illustrated in FIGS. 9–11, the top blade guide discs 22 can be typically attached by a braze 24 to each of the top guide blade mount bolts 9 and bottom blade guide discs 23 can be likewise secured by a brace 24 to each of the bottom guide block mount bolts 9 for guiding the bandsaw blade 22 in the same manner as the top blade guide blocks 20 and the bottom blade quick blocks 21 illustrated in FIG. 1. Accordingly, as illustrated in the drawings, the cutting segment of the bandsaw blade 16 is maintained in a horizontal cutting plane between the first blade support 2 and second blade support 18. The guide for bandsaw blade 1 can equally well be set up to guide and stabilize the cutting segment of the bandsaw blade 16 in a vertical orientation by horizontally mounting the first blade support 2 and second blade support 18, according to the above description of embodiments. Furthermore, as a workstock (not illustrated) is applied to the blade teeth 17 of the bandsaw blade 16, the blade guide wheels 11 prevent the bandsaw blade 11 from slipping out from between the top blade guide blocks 20 and bottom blade guide blocks 21 or the top blade guide discs 22, and the bottom blade guide discs 23 of the respective first blade support 2 and second blade support 18.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A guide for a bandsaw blade having a non-cutting edge, comprising a pair of blade supports provided in spaced-apart relationship with respect to each other for receiving the band saw blade, said pair of blade supports each comprising a support post; a first bracket adjustably mounted on said support post; at least one first carbide blade guide block removably provided on said first bracket for engaging a first surface of the bandsaw blade; a second bracket adjustably mounted on said support post; at least one second carbide blade guide block removably provided on said second bracket for engaging a second surface of the bandsaw blade; and a rotatable blade guide wheel removably mounted on a selected one of said first bracket and said second bracket for engaging the non-cutting edge of the bandsaw blade and maintaining the bandsaw blade in position between said at least one first carbide blade guide block and said at least one second carbide blade guide block.

2. A guide for a driven bandsaw blade, said guide comprising a first blade support and a second blade support provided in spaced-apart relationship with respect to each other adjacent to a horizontally-disposed segment of the bandsaw blade, said first blade support and said second blade support each comprising a slotted support post; a top bracket vertically adjustably mounted on said slotted support post and a first blade-engaging mechanism provided on said top bracket for engaging the top surface of the bandsaw blade; a slot provided in said top bracket and a guide wheel adjusting mechanism extending through said slot; a bottom bracket vertically and adjustably mounted on said slotted support post beneath said top bracket and a second blade engaging mechanism provided on said bottom bracket for engaging the bottom surface of the bandsaw blade; and a blade guide wheel rotatably mounted on said bottom bracket in engagement with said guide wheel adjusting mechanism in adjustable relationship with respect to said second blade engaging mechanism for maintaining the bandsaw blade in position between said first blade engaging mechanism and said second blade engaging mechanism.

3. The guide of claim 2 wherein said first blade engaging mechanism and said second blade engaging mechanism each comprises at least one carbide blade guide block provided on said top bracket and said bottom bracket, respectively.

4. The guide of claim 2 wherein said first blade engaging mechanism and said second blade engaging mechanism comprises two carbide blade guide blocks provided on said top bracket and said bottom bracket, respectively.

5. A guide for a driven bandsaw blade, said guide comprising a first blade support and a second blade support provided in spaced-apart relationship with respect to each other adjacent to a horizontally-disposed segment of the bandsaw blade, said first blade support and said second blade support each comprising a slotted support post; a top bracket vertically adjustably mounted on said slotted support post and a top pair of carbide blade guide blocks provided on said top bracket for engaging the top surface of the bandsaw blade; a bottom bracket vertically and adjustable mounted on said slotted support post beneath said top bracket and a bottom pair of carbide blade guide blocks provided on said bottom bracket for engaging the bottom surface of the bandsaw blade; and a slot provided in said bottom bracket, a guide wheel adjusting mechanism extending through said slot and a blade guide wheel rotatably mounted on said bottom bracket in engagement with said guide wheel adjusting mechanism in adjustable relationship with respect to said bottom pair of carbide blade guide blocks for maintaining the bandsaw blade in position between said top pair of carbide blade guide blocks and said bottom pair of carbide blade guide blocks.

6. A guide for a driven bandsaw blade, said guide comprising a first blade support and a second blade support provided in spaced-apart relationship with respect to each other adjacent to a horizontally-disposed segment of the bandsaw blade, said first blade support and said second blade support each comprising a slotted support post, a top bracket vertically adjustably mounted on said slotted support post and a top pair of carbide blade guide blocks provided on said top bracket for engaging the top surface of the bandsaw blade; a bottom bracket vertically and adjustably mounted on said slotted support post beneath said top bracket and a bottom pair of carbide blade guide blocks provided on said bottom bracket for engaging the bottom surface of the bandsaw blade; and a slot provided in said top bracket, a guide wheel adjusting mechanism extending through said slot and a blade guide wheel rotatably mounted on said top bracket in engagement with said guide wheel adjusting mechanism in adjustable relationship with respect to said top pair of carbide blade guide blocks for maintaining the bandsaw blade in position between said top pair of carbide blade guide blocks and said bottom pair of carbide blade guide blocks.

7. A guide for a driven bandsaw blade, said guide comprising a pair of blade supports provided in spaced-apart relationship with respect to each other adjacent to the blade, each of said pair of blade supports comprising a substantially vertically oriented support post having linear slots therein; a top bracket adjustably mounted on said support post at a first one of said slots and at least one top carbide blade guide block adjustably provided on said top bracket for engaging the top surface of the bandsaw blade; a bottom bracket adjustably mounted on said support post at a second one of said slots beneath said top bracket and at least one bottom carbide blade guide block adjustably provided on said bottom bracket for engaging the bottom surface of the bandsaw blade; a bottom wheel adjustment slot provided in said bottom bracket and a top wheel adjustment slot provided in said top bracket; a guide wheel mount bolt extending through a selected one of said bottom wheel adjustment slot and said top wheel adjustment slot and a blade guide wheel rotatably mounted on said guide wheel mount bolt for adjustably maintaining the bandsaw blade between said at least one carbide blade guide block provided on said top bracket and said at least one carbide blade guide block provided on said bottom bracket.

8. The guide of claim 7 comprising a top bracket mount bolt extending through said first one of said slots for engaging said top bracket and a bottom bracket mount bolt extending through said second one of said slots for engaging said bottom bracket.

\* \* \* \* \*